(12) United States Patent
Beck et al.

(10) Patent No.: US 8,890,022 B2
(45) Date of Patent: Nov. 18, 2014

(54) METHOD FOR WELDING TWO METAL PARTS AND CONNECTING ARRANGEMENT WITH TWO METAL COMPONENTS

(75) Inventors: Markus Beck, Elchingen (DE); Wolfgang Becker, Ulm (DE); Markus Geyer, Sittensen (DE); Ulix Goettsch, Oberboihingen (DE); Klaus Goth, Sindelfingen (DE); Wolfgang Gref, Dietingen (DE); Claus-Dieter Reiniger, Korb (DE)

(73) Assignee: Daimler AG, Stuttgart (DE)

( * ) Notice: Subject to any disclaimer, the term of this patent is extended or adjusted under 35 U.S.C. 154(b) by 344 days.

(21) Appl. No.: 13/515,015

(22) PCT Filed: Dec. 3, 2010

(86) PCT No.: PCT/EP2010/007348
§ 371 (c)(1),
(2), (4) Date: Aug. 9, 2012

(87) PCT Pub. No.: WO2011/069621
PCT Pub. Date: Jun. 16, 2011

(65) Prior Publication Data
US 2012/0298638 A1   Nov. 29, 2012

(30) Foreign Application Priority Data
Dec. 11, 2009 (DE) .................. 10 2009 057 997

(51) Int. Cl.
*B23K 26/24* (2014.01)
*B23K 26/26* (2014.01)

(52) U.S. Cl.
CPC ............... *B23K 26/246* (2013.01); *B23K 26/24* (2013.01); *B23K 26/26* (2013.01)
USPC ................. 219/121.64; 219/121.83

(58) Field of Classification Search
CPC ........ B23K 26/00; B23K 26/02; B23K 26/08; B23K 26/20; B23K 26/246; B23K 26/26
USPC ................. 219/121.63, 121.64, 121.83
See application file for complete search history.

(56) References Cited

U.S. PATENT DOCUMENTS 4,914,268 A * 4/1990 Hixon et al. ............. 219/121.14
5,879,416 A   3/1999 Nakamura et al.
(Continued)

FOREIGN PATENT DOCUMENTS

DE    19924905  A1   12/2000
DE   102008022142 B3   11/2009
(Continued)

OTHER PUBLICATIONS

Office Action, dated Aug. 28, 2013, in JP 2012-542387.
(Continued)

*Primary Examiner* — Samuel M Heinrich
(74) *Attorney, Agent, or Firm* — Patent Central LLC; Stephen A. Pendorf (57) ABSTRACT

A method for welding two metal parts from aluminum alloys with the steps:
  melting of the metal parts to be joined in a weld region through an energy input by means of a laser beam with the formation of a weld seam,
  smoothing the surface of the weld seam through a further energy input with partial melting of the weld seam in the region of the surface,
wherein the further energy input is a defocused laser beam, of which the focal point is positioned in the beam direction in front of or behind the surface of the weld seam,
wherein the defocused laser beam and the surface normal of a surface of the two metal parts to which the laser beam is applied, incorporate an angle of greater than or equal to 5 degrees,
and a connecting arrangement welded with this method.

8 Claims, 6 Drawing Sheets

(56) References Cited

U.S. PATENT DOCUMENTS

| | | | |
|---|---|---|---|
| 7,015,417 B2 * | 3/2006 | Takikawa et al. | 219/121.64 |
| 8,076,607 B2 * | 12/2011 | Lentz | 219/121.64 |
| 8,110,774 B2 | 2/2012 | Huonker et al. | |
| 2004/0099644 A1 | 5/2004 | Allen | |
| 2005/0028897 A1 | 2/2005 | Kurz et al. | |

FOREIGN PATENT DOCUMENTS

| | | |
|---|---|---|
| DE | 102008062866 A1 | 5/2010 |
| EP | 1618984 A1 | 1/2006 |
| EP | 1747836 A1 | 1/2007 |
| JP | 0919778 A | 1/1997 |
| JP | 10328860 A | 12/1998 |
| JP | 2007260743 A | 10/2007 |
| JP | 2008114276 A | 5/2008 |

OTHER PUBLICATIONS

International Preliminary Report on Patentability dated Jul. 12, 2012.

* cited by examiner

METHOD FOR WELDING TWO METAL PARTS AND CONNECTING ARRANGEMENT WITH TWO METAL COMPONENTS

The invention relates to a method for welding two metal parts according to the preamble of claim 1 and a connecting device with two metal parts according to the preamble of claim 7.

A generic method is disclosed by US 2005/0028897. This describes a method for avoiding cracks in welding, in repair welding or in cladding of parts which consist of metal alloys and are prone to hot cracking. During the method a first heat source is directed to the parts and a melt region is formed, wherein the heat source and the parts are moved relative to each other. Furthermore a second, additional heat source is provided which is directed to the parts and follows the first heat source at a distance at the same speed and in the same direction, wherein the cooling rate of a solidification region of the melt region is reduced and indeed without melting the solidification region. Stress loads are thereby to be avoided or even produced in order to avoid a formation of hot cracks.

EP 1 747 836 A1 discloses a method for welding metal parts, wherein a weld laser beam of a laser is focused on the metal parts. The metal parts are welded together by the weld laser beam with the formation of a weld seam. Then a heat treatment of the weld seam is provided wherein the heat treatment is carried out by a laser beam. The method is thereby intended to cancel out a structural change of the material of the metal parts again due to the welding thereof in the region of the weld seam.

The known methods thereby all have the disadvantage that the surface topography of the weld seam produced comprises superelevations and/or can be very sharp edged. This is the case particularly when the metal parts to be welded consist of aluminum alloys, in particular when at least one of the joint elements is formed from an aluminum alloy of series 5000 or 7000. The corresponding weld regions of the parts are thereby no longer suitable for certain functions, for example for the application of seals or strips. In addition there is a risk of injury during subsequent manual assembly operations.

It is thus an object of the present invention to provide a method for welding metal parts which facilitates a high functionality of the weld region.

This object is achieved through a method for welding two metal parts with the features of claim 1. Advantageous embodiments with useful and non-trivial developments of the invention are indicated in the dependent claims.

A method for welding two metal parts from aluminum alloys comprises a first step, wherein the metal parts to be joined are melted in a weld region through an energy input by means of a laser beam with the formation of a weld seam. According to the invention a further step is provided wherein the surface of the weld seam is smoothed by a further energy input with partial melting of the weld seam in the region of the surface, wherein the further energy input is carried out by means of a defocused laser beam, of which the focal point is positioned in the beam direction in front of or behind the surface of the weld seam and wherein the defocused laser beam and the surface normal of a surface of the two metal parts, to which the laser beam is applied, incorporate an angle of greater than or equal to 5 degrees.

Through this at least area-wise re-melting and smoothing of the surface the weld seam is re-melted on the surface whereby this results in a removal of the individual raised elements mentioned above. The topography of the weld seam is now no longer sharp edged but instead much smoother, whereby the two metal parts have a very high functionality in the weld region in order to be able to provide seals there for example.

This means the constitution of a very good surface quality in the weld region, whereby this goes hand in hand with a high functionality. The thus created high surface quality of the weld region also allows, like the unwelded surfaces of the metal parts, for example an application of seals or strips which would be damaged by the sharp edged topography without the smoothing of the weld seam.

The further energy input by means of a defocused laser beam, of which the focal point is positioned in the beam direction in front of or behind the surface of the weld seam, allows a precise and rapid process management, whereby this goes hand in hand with high quality with simultaneously low costs for the method according to the invention. The defocused laser beam can be for example the laser beam of a laser, by means of which the metal parts are melted in the weld region. It can also be provided that the defocused laser beam is the laser beam of a further laser which is subsequently supplied for example after the first laser beam at a certain interval.

According to the invention the defocused laser beam and the surface normal of a surface of the two metal parts, to which the laser beam is applied, thus the surface, into which the weld seam is introduced, incorporate an angle which amounts to at least 5°, whereby damage to the optics is avoided through laser radiation reflected back from the surface of the part.

An area impacted with energy by the defocused laser beam is for example 4 to 16 times, in particular 9 times, greater than an area which is impacted with energy by the focused laser beam for the welding of the two metal parts. This allows a specific energy input, thus an energy input per area, which is large enough to partially re-melt the weld seam and thus to smooth the surface of the weld seam without completely re-melting the weld seam.

As the defocused laser beam travels over the weld seam the process parameters are thereby to be selected so that sufficient energy is absorbed for the partial re-melting of the weld seam.

If two metal parts are welded through the method according to the invention which consist of aluminum alloys, surfaces of these aluminum alloys are particularly reflective for the wavelength of solid body lasers, which is why there is an imminent risk of destruction of the optics or the fibre optic cable through radiation reflected back from the surface of the part. This risk is present in particular with the defocused laser beam as this is also applied to smooth areas directly connecting to the weld seam which can reflect the laser beam. In order to avoid destruction the defocused laser beam thus incorporates with the surface normal an angle which is greater than or equal to 5°.

It should be noted at this point that energy distribution of the defocused laser beam at least substantially obeys a Gaussian distribution, which means that in outer regions of the area impacted with energy by means of the laser beam a lower energy density is present than in inner regions of this area.

The defocused laser beam can travel over the weld seam, thus a so-called defocused travel can for example take place, so long as the weld seam or the weld region is still warm. Defocused travel is also possible when the weld seam or the weld region has already cooled, for example to ambient temperature. In any case defocused travel can take place directly in the reverse direction, thus in the opposite direction to the formation of the weld seam.

Irregular and sharp-edged raised elements, an end crater and a seam superelevation of the weld seam are to be smoothed in particular through the defocused travel.

Said seam superelevation thereby lies in the initial region of the weld seam and is produced in that the laser beam is applied at the start of the formation of the weld seam to the corresponding surface of the metal part, the metal melts and even vaporises. The vapour capillary (keyhole) thereby formed is guided in the corresponding desired direction for formation of the weld seam. Due to the material displacement through the vapour capillary and due to the flow of the melted metal around the vapour capillary contrary to the welding direction, a seam superelevation is produced at the start of the seam. This seam superelevation is to be smoothed by the defocused laser beam, wherein the defocused travel is carried out for example in the reverse direction of the laser beam beyond the start of the seam, thus the initial region of the weld seam, in order to smooth the seam superelevation reliably.

Said end crater thereby lies in the end region of the weld seam lying opposite the seam superelevation and is likewise to be smoothed by the defocused travel. The end crater is thereby filled with melted metal and leveled.

It should be noted at this point that the method according to the invention can be used for example within the scope of a remote laser beam welding method, wherein it is a matter of a robot-guided welding method.

The remote laser beam welding method is a welding method wherein the laser beam is directed from a greater distance to the corresponding surface of the metal parts and applied, wherein the laser beam is also guided through a scanner on the surface and deflected to the corresponding desired points. Mirrors of the scanner are arranged in a welding head of the welding device which cause a fine adjustment of the laser beam and deflect it to the desired points.

The scanner in turn is held on a robotic arm which moves the scanner wherein this movement of the scanner takes place more roughly through the robotic arm than said fine adjustment of the laser beam by means of the scanner and the mirror thereof.

In addition the guidance and a deflection of the laser beam by means of the scanner or the mirrors can be carried out extremely quickly and virtually by leaps and bounds, whereby a particularly rapid re-positioning of the laser beam and thus the start of the weld seam is facilitated. This allows a particularly low non-productive time of the weld process, which keeps the whole cycle time within limits and thus allows a particularly favourable method with very low cycle times.

In particular the formation of two weld seams lying close together which lie for example at a distance of 20 to 30 mm one beside the other is possible as the laser beam, as described, can be implemented and re-positioned particularly quickly.

Through this quick and flexible re-positioning it is in particular also possible to integrate the defocused travel advantageously into the processing sequence. Directly after welding the laser beam is defocused through the scanner and is guided contrary to the weld direction over the previously welded seam. This takes place during a continuous movement of the scanner through the robot over the surface of the metal parts to be welded.

The remote laser beam welding method is quicker than conventional methods approximately by factor 3, but whereby no welding additive materials are possible due to the rapid readjustment of the laser beam.

The method according to the invention now also allows within the scope of the remote laser beam welding method, in particular in connection with the metal parts, which are formed from aluminum alloys of the series 5000 and/or 7000, the constitution of very good weld seams with a high functionality and this without welding additive materials.

This is advantageous insofar as the metal parts form a very thin melt from said aluminum alloys, the topography of which, due to a great roughness, fracturing, sharp edges etc., is disadvantageous having regard to the described functionality. These disadvantages are overcome by the method according to the invention.

The described first aspect of the invention thus relates to the method according to the invention which allows a high functionality of the metal parts on the surface of the metal parts facing the energy input, in particular by means of the laser beam, to be achieved. The second aspect of the invention now relates to a method which allows a particularly high functionality to be achieved for the surface which faces away from the energy input, in particular by means of the laser beam, and thus lies opposite the first surface. The first surface is described as a seam upper bead while the second surface lying opposite the first surface is described as a seam lower bead.

An advantageous embodiment of the invention relates to a method for welding two metal parts of an aluminum alloy, wherein the metal parts to be joined are melted in a melt region through an energy input by means of a laser beam with the formation of a weld seam. A residual material thickness region of the metal parts connecting in the direction of the energy input, thus of the laser beam, and not melted through the energy input, thus of the laser beam, is provided. In addition a geometry change, resulting from the energy input, of the surface facing away from the energy input, thus the laser beam, is determined for at least one of the metal parts in the region of the weld seam. The extension of the residual material thickness region in the direction of the energy input, thus the laser beam, is then formed in dependence upon the determined geometry change.

In other words this means that the metal parts are not to be completely melted through but instead the residual material thickness region is provided. This avoids on the one hand a poor, rough and sharp edged topography of the surface facing away from the energy input as a result of melting thereof. Nevertheless the weld seam must be formed so deep in the direction of the energy input and thus have such a high penetration depth that a solid connection of the metal parts is produced. A compromise is thus to be created between the penetration depth of the weld seam and thus for the creation of a solid connection of the metal parts on the one hand and the creation of a high surface quality on the surface of the metal parts facing away from the energy input (laser beam) or in case of overlapping of the parts of the lower of the two metal parts on the other hand.

Even if the metal parts are not completely melted through, thus also in case of a so-called non-melt-through, there is a change in the geometry of the surface facing away from the energy input which is described below as the lower side. This geometry change which is also described as a change of the topography or as a press-through, is determined or detected, for example in previous tests, and constitutes a measure of how closely the weld seam produced through the melt lies in front of said lower side, thus how large the extension of the residual material thickness region is in the direction of the energy input. Likewise the press-through thus constitutes a measure for the strength of the connection of the two metal parts.

By determining or detecting the press-through the above-mentioned compromise can be reached. A profile height and a profile angle of this press-through can thus be determined, from which conclusions can be drawn on the strength of the connection and the extension of the residual material thickness region extending in the direction of the energy input.

If the melted region of the weld seam is particularly close to the lower side, the press-through has a sharp and high topography while the topography has a broad and flat progression if the melted region of the weld seam lies further away from the lower side.

In dependence upon this geometry change or this topography according to the invention the method can be adjusted so that a desired topography of the lower side is set in the region of the weld seam so that on the one hand a high surface quality and on the other hand a fixed connection between the metal parts is facilitated.

A particularly advantageous region of said profile height thereby lies between 20 to 100 μm inclusive, while a region of said profile angle lies in a particularly advantageous range of 1° to 5° inclusive. In particular the profile angle is a very good measure for the strength of the connection in case of simultaneous realisation of a very good surface quality for constitution of the described functionality also on the surface facing away from the energy input. If the profile angle and/or the profile height lie in the respective region the two metal parts are fixedly connected to each other in spite of the non-melt-through.

The inventive method is particularly suitable for welding metal parts which consist substantially of aluminum alloys, in particular when at least one of the joining elements is formed from an aluminum alloy of the series 5000 or 7000, and are welded to each other on function flanges. Besides the creation of the high functionality of the weld region there is furthermore an injury risk with subsequent manual assembly operations, as sharp edges on which an assembler could cut himself are avoided or eliminated.

It should be noted at this point that the inventive method according to the first aspect of the invention can be combined directly with the inventive method of the second aspect of the invention in order to constitute a high surface quality with a high functionality both on the seam upper bead and on the seam lower bead of the two metal parts.

The invention also includes a connecting arrangement with two metal parts which are welded to each other wherein the two metal parts are welded to each other through an inventive method of the first aspect of the invention, through an inventive method of the second aspect of the invention or through a combination of the inventive methods of both aspects. Advantageous embodiments of the connecting arrangements are to be regarded as advantageous embodiments of the respective method and vice versa.

Further advantages, features and details of the invention follow from the subsequent description of a plurality of preferred embodiments and by reference to the drawings. The features and feature combinations indicated above in the description and the features and feature combinations indicated below in the description of the drawings and/or solely shown in the drawings can be used not only in the respectively indicated combination but also in other combinations without going outside of the scope of the invention.

Figure 1:
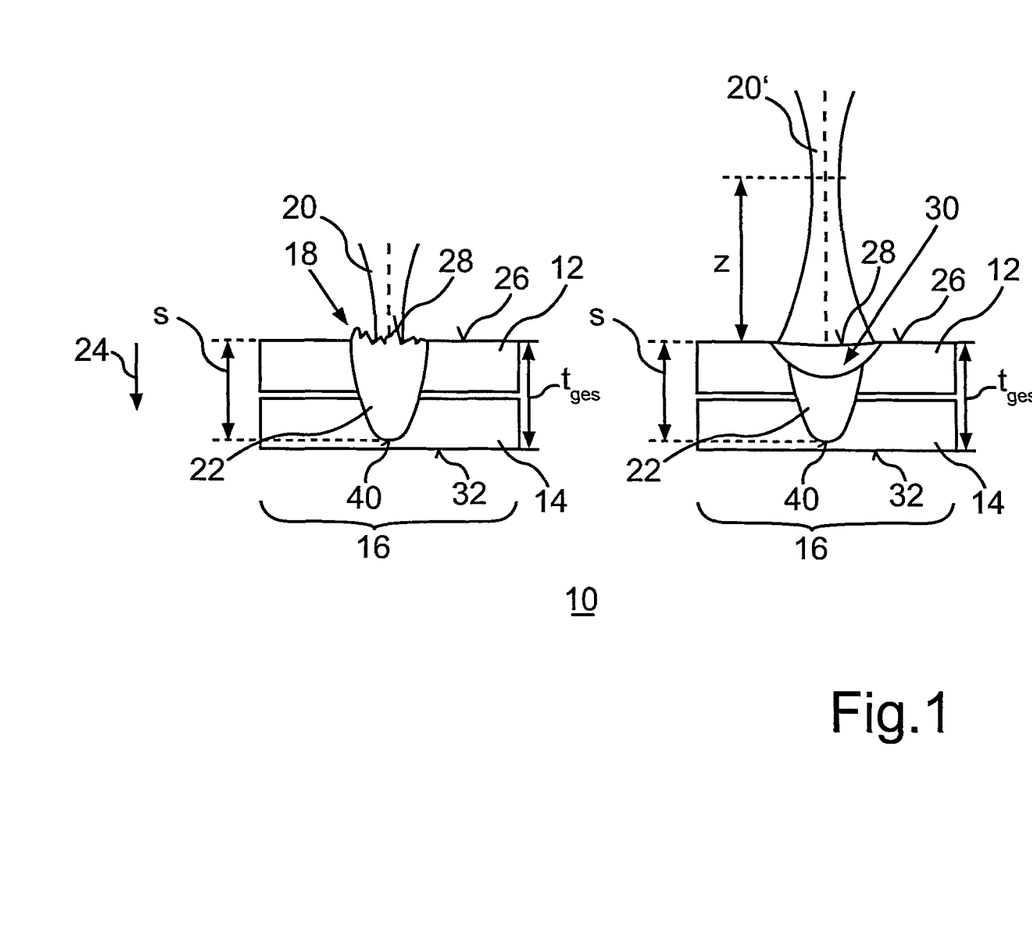
FIG. 1 a schematic view of two steps of a method for welding two metal parts.

FIG. 1 shows a method for welding a first metal part 12 to a second metal part 14 which have been formed from an aluminum alloy of the series 5000 or 7000. The metal parts 12 and 14 are initially arranged overlapping in an overlap region 16 whereby an overlap joint is formed.

The metal parts 12 and 14 to be joined are then melted in a weld region 18 by an energy input by means of a laser beam 20 with the formation of a weld seam 22. The laser beam 20 is thereby focused on the weld seam 22 or on a surface 26, which is above in the beam direction according to a direction arrow 24, of the upper metal part 12. This means that the distance z of the focal point of the laser beam 20 from the surface 26 amounts to zero millimeters.

As can be deduced from FIG. 1, there is an irregular surface 28 of the weld seam 22 which is to be described as a seam upper bead.

The surface 28 of the weld seam 22 is then smoothed by a further energy input with partial melting of the weld seam in the region of the surface 28. The reference numeral 30 thereby characterises a melted region with a regular seam upper bead.

The further energy input is carried out by means of a defocused laser beam 20', of which the focal point is positioned in the beam direction in front of the weld seam 22 or in front of the surface 28. The distance z of the focal point of the laser beam 20' is thereby for example 40 mm. The laser beam 20' can thereby be the same laser beam 20 which is merely defocused and guided over the weld seam 22.

As can also be derived from FIG. 1, for the method 10 a penetration depth s of the weld seam 22 is formed to be lower than an overall material thickness $t_{ges}$ of the metal parts 12 and 14 to be joined. This means that the weld seam 22 does not penetrate a surface 32, which is lower in the beam direction according to the direction arrow 24, of the metal part 14 which is lower in the beam direction according to the direction arrow 24. A residual material thickness region of the metal parts 12 and 14 is thus provided in the direction of the laser beam 20, of which the extension (thickness) in the direction of the laser beam 20 is formed in dependence upon a determined geometry change, resulting from the energy input by means of the laser beam 20, of the surface 32 of the metal part 14 facing away from the laser beam 20 in the region of the weld seam 22, whereby this is clarified using the following drawings.

Besides the high surface quality of the surface 26, a very good surface quality of the surface 32 is also realised by smoothing the surface 28 of the weld seam 22.

In the method illustrated by means of the drawings for welding the metal parts 12 and 14 the metal parts 12 and 14 are connected to each other through a series of quilting or stitch seams along a flange region by means of a remote laser beam welding method, wherein the metal parts 12 and 14 are formed from an aluminum alloy of the series 5000. The distance between the stitch seams along the flange region is approximately 60 mm from stitch seam middle to stitch seam middle. The seam length for each stitch seam is 30 mm, wherein the sheet thickness of the two metal parts 12 and 14 is respectively 1.5 mm. The flange region of the metal parts to be welded is pressed by tensioning fingers against each other which are arranged in the flange region between the stitch seams.

The laser beam 20 and the defocused laser beam 20' are produced by a disc laser which has a power of 6 kW and a wavelength of approximately 1 μm. The power of the laser is fed via a fibre optic cable which is formed as a fibre glass cable with a core diameter of 200 μm to a processing head which is formed as a 3D scanner. The scanner is fixed on a robot flange.

The scanner comprises a motorised collimation for moving the laser beam 20 or 20' in the beam direction (z direction), whereby this movement can be carried out in z direction over a path length of +/−70 mm.

The scanner further comprises two movable mirrors for deflecting or positioning the laser beam 20 or 20' in two directions (x and y direction) in the scan volume which extend perpendicular to each other and respectively perpendicular to the z direction (Cartesian coordinate system). The scan volume is an elliptic scan volume with dimensions of approximately 320 mm×190 mm×70 mm. The focal width of the focusing optics of the scanner is 450 mm and the image ratio is 3:1. The focus diameter is 600 um.

In the method for welding the metal parts 12 and 14 the material of the metal parts 12 and 14 is correspondingly melted wherein the focus of the laser beam is 20 is z=0 having regard to the surface 26 of the metal part 12 or the upper flange of the metal part 12. At the start of welding there is a radiation angle between the laser beam 20 and the surface normal of the surface 26 of 0°. The weld speed, thus the speed at which the laser beam 20 is guided over the surface 26, is 10 m/min, whereby a pure weld duration for a stitch seam of 180 ms results. At this speed the lower metal part is not completely welded through. Said residual material thickness region remains with an extension (thickness) of 0.2 to 1 mm in the direction of the laser beam.

In spite of this non-weld-through a geometry change forms on the surface 32 in the region of the weld seam 22, thus a change in the topography of the surface 32, which is also described as a press-through, whereby it can be a remaining plastic deformation due to the thermal extension.

Figure 4:
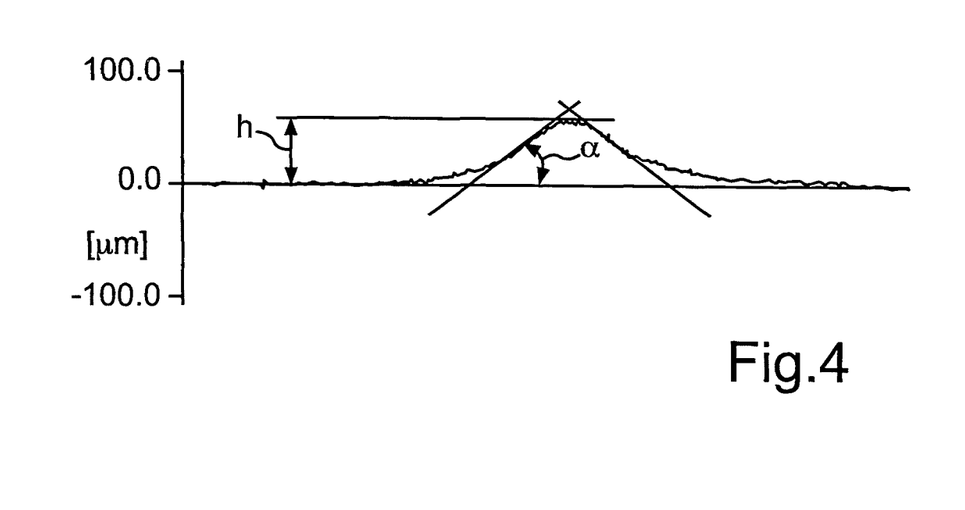

From an overall view with FIG. 4 a profile height of this press-through amounts to approximately 20 to 100 μm, wherein a profile angle of the press-through amounts to approximately 0.5 to 3°. The profile height and the profile angle are thereby a good measure for the extension of the residual material thickness region extending in the direction of the laser beam 20, thus for the non-melted residual material thickness and thus also a measure for the penetration depth s of the weld seam 22 or indirectly for the strength of the weld seam 22 and thus for the connection of the metal parts 12 and 14.

Directly after the formation of the weld seam 22 the laser beam 20 is defocused by +40 mm, resulting in the aforementioned distance z=40 of the focal point of the laser beam 20' to the surface 26. A beam spot diameter of the laser beam 20 or 20' is thereby enlarged on the surface 26 by around factor 3 in comparison with the beam spot diameter of the focused laser beam 20. A defocused travel over the weld seam 22 formed in the described way in the opposite direction to the previous movement direction is carried out for formation of the weld seam 22, whereby the surface 28 or a surface region is re-melted up to approximately a depth of 0.1 to 1 mm of the previously welded and largely already solidified weld seam 22 and thereby smoothed and leveled. The defocused travel thereby takes place with a power of the laser of 6 kW and a speed of approximately 18 m/min, whereby this results in a duration for the defocused travel of 100 ms.

After the defocused travel the laser beam 20' is deflected in a few milliseconds at the start of the next stitch seam, whereby the next stitch seam is then formed. Welds, thus focused travel, and defocused travel for smoothing the corresponding surfaces 28 thereby alternate with each other.

The required movement of the mirrors of the scanner and the motorised collimation is determined by a control computer unit, and indeed in consideration of the previously adjusted or taught positions of the stitch seams, from programmed weld parameters and in consideration of the movement of the processing optics or the scanner which are held on a robot for movement.

The robot speed for rough orientation of the laser beam 20 or 20' thereby amounts to 12.5 m/min and thus lies clearly above the mentioned speed of the laser beam 20 for formation of the weld seam 22 of 10 m/min, which is facilitated through the rapid jumping of the laser beam 20 from one stitch seam to the next stitch seam due to the rapid movement of the mirrors of the scanner.

Figure 2:
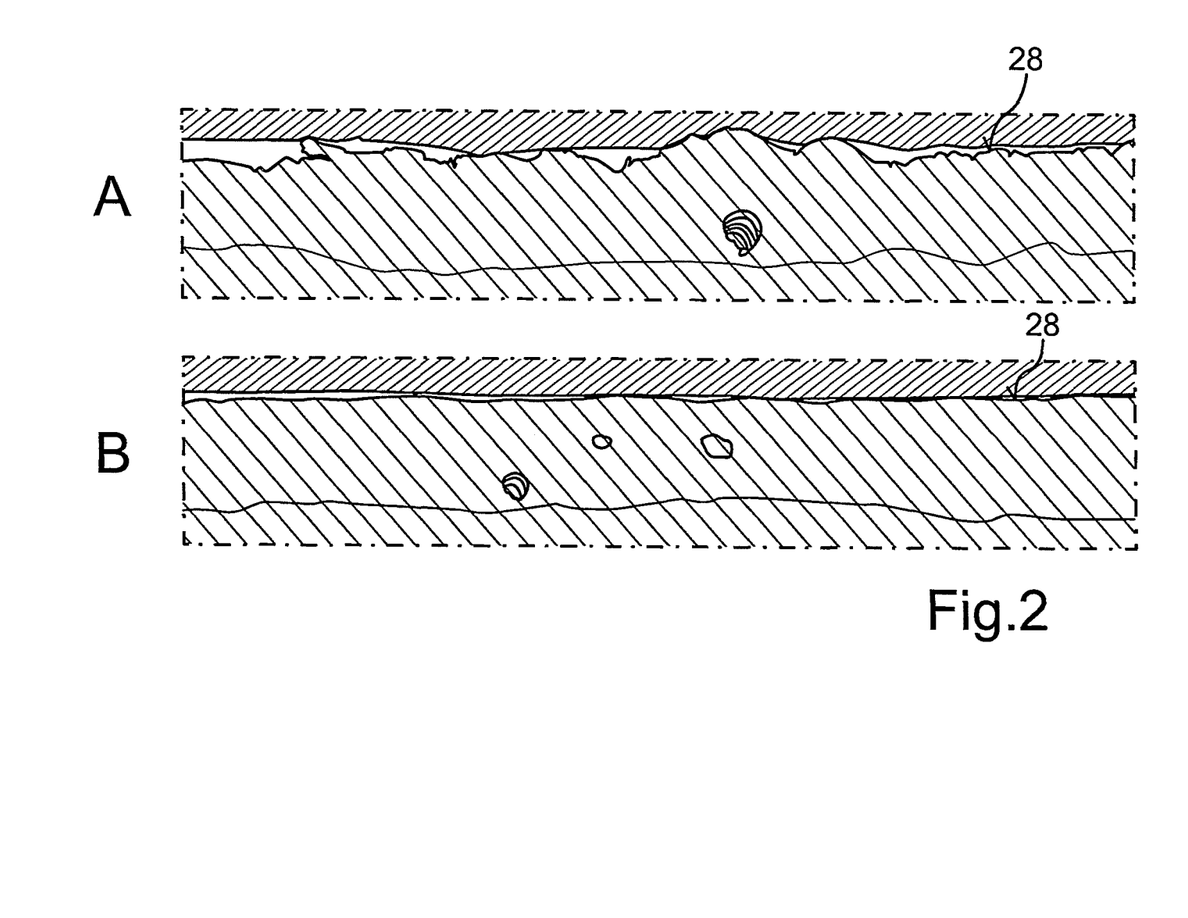
FIG. 2 a comparison of a longitudinal section of a weld seam which has been produced through the method according to FIG. 1, before and after the second step of the method according to FIG. 1, FIG. 3 a correlation between a penetration depth of the weld seam which is formed in the method according to FIG. 1 and a strength of the connection of the metal parts which are welded in the method, FIG. 4 a representation of a height profile transversely to the weld seam on the surface facing away from the energy input which is formed in the method according to FIG. 1, FIG. 5 a correlation between the height profile according to FIG. 4 and the penetration depth of the weld seam which is formed in a method according to FIG. 1, and FIG. 6 a correlation between the strength of the connection of the metal parts which are welded to each other through a method according to FIG. 1 and the height profile according to FIGS. 4 and 5.

FIG. 2 shows according to illustration A a longitudinal section through the weld seam 22 before the smoothing of the surface 28. An uneven surface 28 with a plurality of sharp edges can be seen.

Accordingly FIG. 2 shows according to illustration B a longitudinal section through the weld seam 22 after smoothing through the further energy input by means of the defocused laser beam 20'. The surface 28 is substantially smoother and has no further sharp edges.

Figure 3:
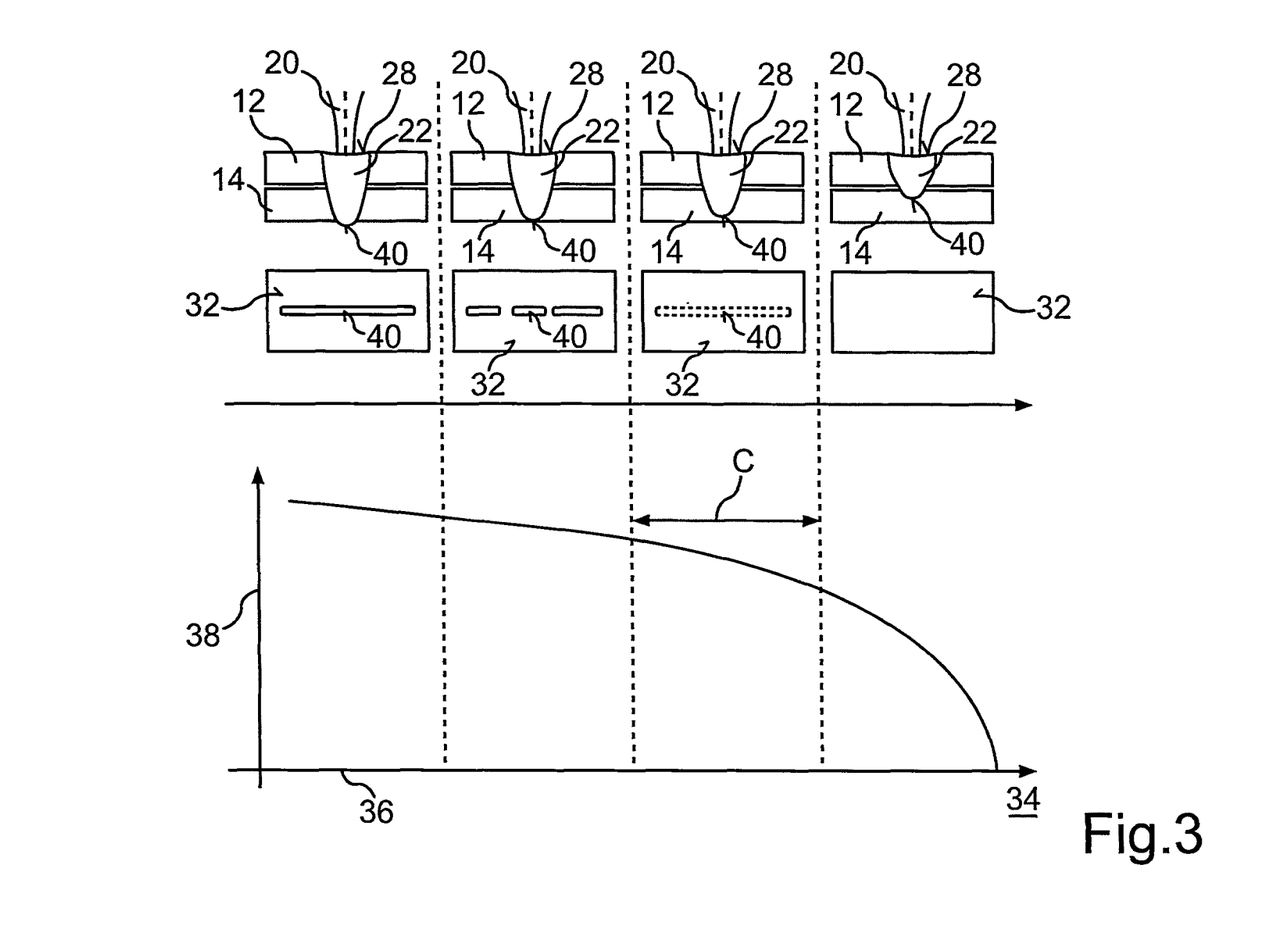

FIG. 3 shows a diagram 34, on the x axis 36 of which a weld speed is entered. The weld speed thereby refers to the speed at which the laser beam is moved for the formation of the weld seam 22 relative to the metal parts 12 and 14. The strength of the connection of the metal parts 12 and 14 is entered on the y axis 38 of the diagram 34.

FIG. 3 further shows both the cross-section of the weld seam 22 known from FIG. 1 and the metal parts 12 and 14 and a top view of the surface 32, lower in the beam direction, of the metal part 14, lower in the beam direction. The surface 28 of the weld seam 22 can be described as a seam upper bead and the opposite surface of the weld seam 22 can be described as a seam lower bead 40.

As can be seen, with increasing weld speed the penetration depth s (FIG. 1) of the weld seam 22 decreases and thus also the penetration depth of the weld seam 22 into the lower component 14. In case of low weld speeds 36 the weld seam even penetrates the lower metal part 14, which is why the seam lower bead 40 can be seen on the surface 32. This does indeed result in a high strength 38 of the connection of the metal parts 12 and 14 but also a poor surface quality of the surface 32, whereby no further seals or similar can be arranged in the weld region 18. These would be damaged by the sharp edges (FIG. 2).

A compromise is thus to be sought between the strength 38 and the penetration depth s of the weld seam 22 and the weld speed 36.

A region C in the diagram thereby constitutes an optimum weld speed range, in which the strength 38 of the connection of the metal parts 12 and 14 is sufficiently large, and also the surface 32 has a desired high surface quality, as a penetration, thus a through-weld, of the second metal part 14 as far as its surface 32 is avoided. This non-weld-through is also to be described as welding-in.

FIG. 4 shows a typical height profile transversely to the seam longitudinal direction measured on the surface 32 with such welding into the lower metal part 13, thus avoiding a complete penetration of the weld seam 22 through it. A profile height is thereby described as h and a profile angle with the angle α.

Figure 5:
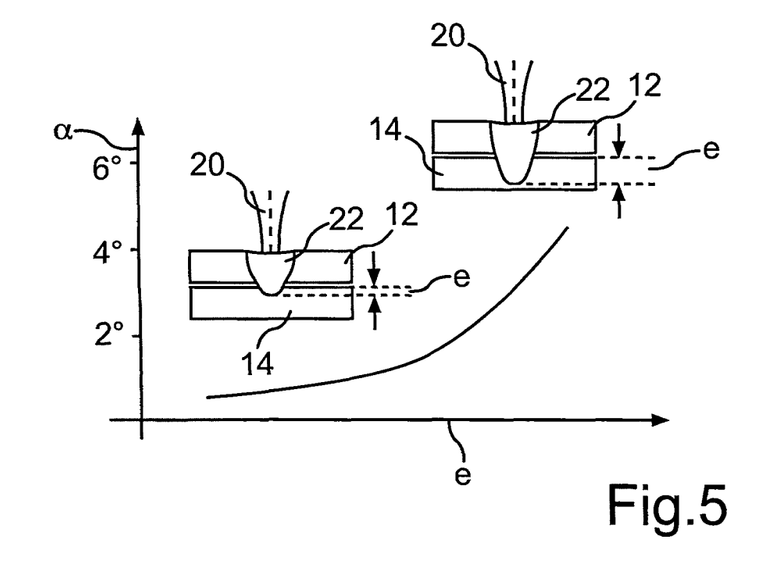

In an overall view with FIG. 5 this means that in case of increasing penetration depth s of the weld seam 22 and thus increasing weld-in depth e of the weld seam 22 into the lower metal part 14 the profile angle α also increases.

Figure 6:
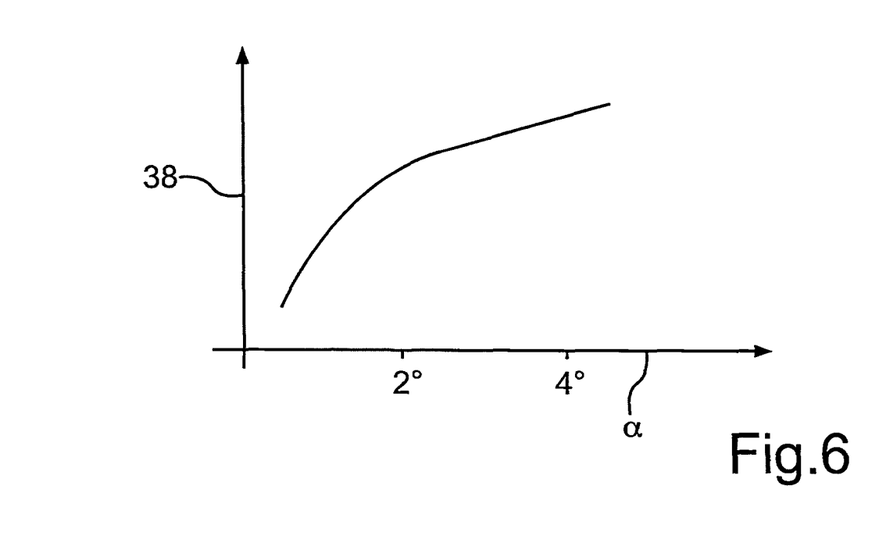

In a further combined view of FIG. 6 the correlation between the profile angle α and the strength 38 of the connection of the metal parts 12 and 14 is shown. With increasing profile angle α the strength 38 also increases. However, the progression of the strength 38 over the profile angle α is degressive, that is to say with effect from a certain profile angle α the strength 38 no longer increases significantly.

Vice versa this means that the formation of a certain profile angle α which is correlated in the known way with the weld-in depth e or the penetration depth s of the weld seam 22 is sufficient and therefore also a certain penetration depth s of the weld seam 22 is sufficient without penetration of the second metal part 14 in order on the one hand to achieve a very good surface quality of the lower surface 32 and at the same time to constitute a particularly solid connection between the metal parts 12 and 14.

The invention claimed is:

1. A method (10) for welding two metal parts (12, 14) from aluminum alloys with the steps:
   melting the metal parts (12, 14) to be joined in a weld region (18) through an energy input by means of a laser beam (20) with the formation of a weld seam (22),
   smoothing the surface (28) of the weld seam (22) through a further energy input with partial melting of the weld seam (22) in the region of the surface (28),
   wherein the further energy input is carried out by means of a defocused laser beam (20'), of which the focal point is positioned in the beam direction (24) in front of or behind the surface (28) of the weld seam (22), and
   wherein the defocused laser beam (20') and the surface normal of a surface (26, 28) of the two metal parts (12, 14), to which the laser beam is applied, incorporate an angle of greater than or equal to 5 degrees.

2. The method according to claim 1, wherein an area impacted with energy by the defocused laser beam (20) is 4 to 16 times larger than an area impacted with energy by the focused laser beam (20).

3. The method according to claim 1, wherein the further energy input takes place by means of the defocused laser beam (20') directly after the first step in a time interval of less than 100 ms and the defocused travel is carried out with the aid of a 3D scanner in the opposite direction to the weld which has taken place in the first step.

4. The method (10) for welding two metal parts (12, 14) of aluminum alloys, according to claim 1, with the additional steps:
   provision of a residual material thickness region of the metal parts connecting in the direction of the energy input, in particular of the laser beam (20), to the weld seam (22), not melted by the energy input, in particular the laser beam (20),
   determining a geometry change resulting from the energy input of the surface (32), facing away from the energy input, in particular the laser beam (20), of at least one of the metal parts (12, 14) in the region of the weld seam (22),
   formation of the extension of the residual material thickness region in the direction of the energy input, in particular the laser beam (20), in dependence upon the determined geometry change.

5. The method (10) according to claim 1, wherein the metal parts (12, 14) are arranged overlapping in an overlap region (26) before welding and the weld region (18) is provided in the overlap region (16).

6. The method according to claim 1, wherein aluminum alloys are welded as two metal parts (12, 14), wherein at least one of the joining elements is formed from an aluminum alloy of the series 5000 or 7000.

7. The method according to claim 1, wherein an area impacted with energy by the defocused laser beam (20) is 9 times larger than an area impacted with energy by the focused laser beam (20).

8. The method according to claim 1, wherein the further energy input takes place by means of the defocused laser beam (20') directly after the first step in a time interval of less than 10 ms, and the defocused travel is carried out with the aid of a 3D scanner in the opposite direction to the weld which has taken place in the first step.

* * * * *